(12) United States Patent
Ruff

(10) Patent No.: US 9,985,509 B2
(45) Date of Patent: May 29, 2018

(54) INDUCTION GENERATOR AND METHOD FOR GENERATING AN ELECTRIC CURRENT USING AN INDUCTION GENERATOR

(71) Applicant: ZF Friedrichshafen AG, Friedrichshafen (DE)

(72) Inventor: Eduard Ruff, Auerbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 265 days.

(21) Appl. No.: 14/441,759

(22) PCT Filed: Oct. 28, 2013

(86) PCT No.: PCT/EP2013/072486
§ 371 (c)(1),
(2) Date: May 8, 2015

(87) PCT Pub. No.: WO2014/072197
PCT Pub. Date: May 15, 2014

(65) Prior Publication Data
US 2015/0288269 A1 Oct. 8, 2015

(30) Foreign Application Priority Data
Nov. 9, 2012 (DE) .................. 10 2012 220 419

(51) Int. Cl.
*H02K 33/00* (2006.01)
*H02K 35/04* (2006.01)

(52) U.S. Cl.
CPC .................. *H02K 35/04* (2013.01)

(58) Field of Classification Search
CPC ......... H02K 35/00; H02K 35/04; H02K 35/02
(Continued)

(56) References Cited

U.S. PATENT DOCUMENTS 3,746,937 A 7/1973 Koike
3,895,244 A 7/1975 Link
(Continued)

FOREIGN PATENT DOCUMENTS

DE 19852471 5/2000
DE 10112072 A1 9/2001
(Continued)

OTHER PUBLICATIONS

International Search Report dated May 12, 2014 in International Application No. PCT/EP2013/072486 (English language).
(Continued)

*Primary Examiner* — Hanh Nguyen
(74) *Attorney, Agent, or Firm* — Brinks Gilson & Lione

(57) ABSTRACT

An induction generator (100) is proposed, having at least one permanent magnet (130) for generating a permanent magnetic field (138), at least one reflux plate (106) for guiding the permanent magnetic field (138), a coil (108) and a spring element (104), wherein the permanent magnet (130) and the reflux plate (106) are separated from one another by an air gap (140) through which the permanent magnetic field (138) passes, and wherein the coil (108) is connected to the spring element (104) and is movably disposed in the air gap (140), characterized in that the spring element (104) is designed to cause an oscillation movement of the coil (108) in the air gap (140) transverse to a magnetic flux of the permanent magnetic field (138) inside the air gap (140) in response to a deflection of the coil (108).

13 Claims, 9 Drawing Sheets

Figure 1A:
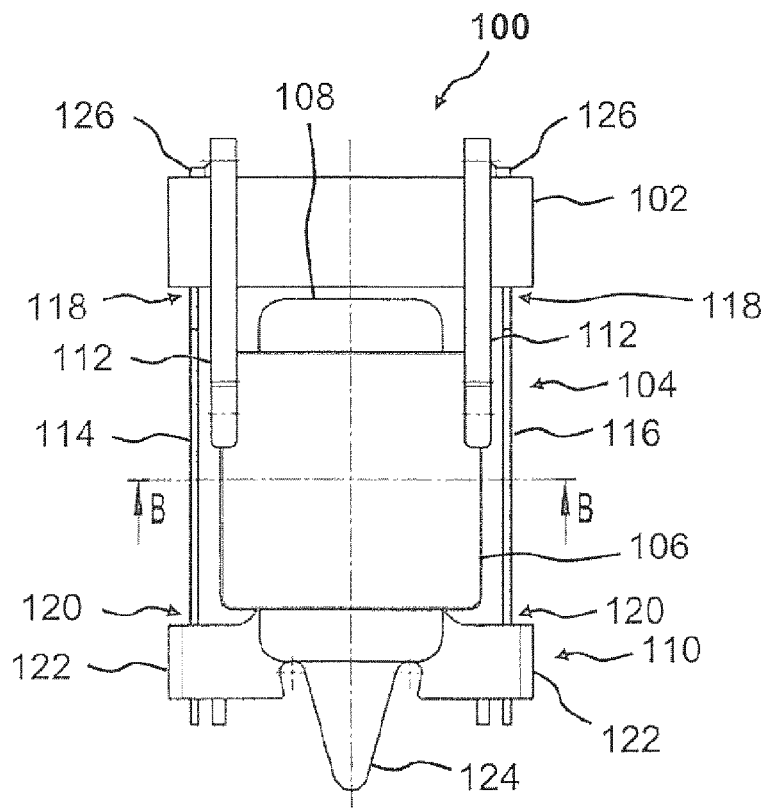

(58) Field of Classification Search
USPC .......................................... 310/12.12, 15, 36
See application file for complete search history.

(56) References Cited

U.S. PATENT DOCUMENTS

| | | | | |
|---|---|---|---|---|
| 7,948,124 | B1* | 5/2011 | Waters | H02K 35/00 310/36 |
| 8,188,622 | B1* | 5/2012 | Waters | H02K 35/04 290/1 R |
| 2006/0091984 | A1* | 5/2006 | Schmidt | H02K 35/04 335/78 |
| 2007/0085425 | A1* | 4/2007 | Hirashima | H02K 33/16 310/15 |
| 2008/0303357 | A1 | 12/2008 | Battlogg et al. | |
| 2008/0315595 | A1 | 12/2008 | Bataille et al. | |
| 2009/0051229 | A1* | 2/2009 | Shau | H02K 35/02 310/15 |
| 2009/0095125 | A1 | 4/2009 | Ekchian et al. | |
| 2009/0146508 | A1* | 6/2009 | Peng | H02K 35/02 310/15 |
| 2010/0194117 | A1* | 8/2010 | Pabon | H02K 35/02 290/1 R |
| 2013/0069451 | A1 | 3/2013 | Ruff | |
| 2013/0285480 | A1 | 10/2013 | Ruff | |
| 2013/0334903 | A1* | 12/2013 | Kim | H02K 35/00 310/28 |

FOREIGN PATENT DOCUMENTS

| | | |
|---|---|---|
| DE | 10315765 A1 | 11/2004 |
| DE | 102010003151 | 9/2011 |
| DE | 102010028622 | 11/2011 |
| DE | 102011002740 | 7/2012 |
| EP | 2079154 | 7/2009 |
| JP | 55-79661 A | 6/1980 |
| WO | 2003/075441 A2 | 9/2003 |
| WO | 2007/076561 A1 | 7/2007 |
| WO | 2007/121367 A2 | 10/2007 |
| WO | 2007/121380 A2 | 10/2007 |
| WO | 2011/117021 | 9/2011 |
| WO | 2011/117031 | 9/2011 |

OTHER PUBLICATIONS

International Search Report dated May 12, 2014 in International Application No. PCT/EP2013/072486 (German language).
Office Action dated Jul. 22, 2013 in corresponding German Application No. 10 2012 220 419.9 (German language).

* cited by examiner

INDUCTION GENERATOR AND METHOD FOR GENERATING AN ELECTRIC CURRENT USING AN INDUCTION GENERATOR

This application is a filing under 35 U.S.C. § 371 of International Patent Application PCT/EP2013/072486, filed Oct. 28, 2013, and claims the priority of German Patent Application DE 10 2012 220 419.9, filed Nov. 9, 2012, both of which are incorporated by reference herein in their entirety.

The present invention relates to an induction generator and a method for generating an electrical current using an induction generator.

Already known electromagnetic energy converters, which are used with wireless switches, for example, always use, fundamentally, the same principle. Through a movement of a magnet system having a permanent magnet, or a movement of a magnet core itself, an abrupt change in the magnetic flux in a magnetic circuit is caused, by means of which electrical energy is generated in a static coil placed on the magnet core by means of induction. Normally, during a switching procedure, the systems use a complete magnetic pole reversal of the magnetic circuit.

In order to improve the high noise development in the generator in known systems, there are concepts for minimizing the losses during impact by the permanent magnet or magnetic core, connected with an increase in frictional losses during the switching procedure. In order to increase the efficiency, it is also possible to convert the energy by means of a rotating generator with a gearing.

DE 101 12 072 A1 discloses a switching element with an actuating member, which is functionally connected to an energy converter in the switching element by means of a lever assembly, such that the movement of the actuating member can be transferred to the energy converter. As a result, the energy converter converts at least a portion of the mechanical energy exerted for actuating the actuating member into electrical energy.

Based on this, the present invention creates an improved induction generator, and an improved method for generating an electrical current in accordance with the independent Claims. Advantageous designs can be derived from the dependent Claims and the following description.

With respect to an induction generator, the electrical energy can be calculated from the following equations:

$$E_e = E_m - E_v$$

$$E_v = E_{vm} + E_{vmg} + E_{ve}$$

Where:
$E_e$=electrical energy
$E_m$=mechanical energy
$E_v$=energy loss
$E_{vm}$=mechanical energy loss
$E_{vmg}$=magnetic energy loss
$E_{ve}$=electrical energy loss The inventive concept presented herein is based on the finding that an efficiency for an induction generator can be significantly increased when the coil of the generator is moved in order to convert the energy, instead of the substantially heavier magnet system.

With a look at the energy formula, this concept can be demonstrated more clearly. Thus, for kinetic energy, or movement energy:

$$E_{kin.} = 0.5 \times m \times V^2$$

Where:
$E_{kin.}$=kinetic energy
m=mass
V=speed

The electric energy from a generator is calculated as follows:

$$E_{el.} = U^2 \times t / R$$

Where:
$E_{el.}$=electrical energy
U=voltage
t=time
R=electrical resistance
$V \approx CU$ Thus, it makes more sense to invest in increasing the speed or voltage instead of in increasing mass or time, or, respectively, in reducing the resistance, in particular with regard to the fact that a magnetostatic increase of the flux density in the ferromagnetic circuit is only possible to a certain extent, due to the laws of nature, because even the best soft magnet materials can only provide a maximum flux density of ca. 2.4 T. As a matter of course, it should be emphasized that the flux density, or the magnetic field should be kept as great as possible; it may, however use practical, for economical reason, to select the flux density in the range of 1.8-2.0 T (Fe, FeSi).

According to embodiments of the present invention, the efficiency of electromagnetic energy conversion can be decisively improved in that a relative heavy element in the ferromagnetic circuit, i.e. the magnet element, or magnet core, is no longer accelerated along a short path as quickly as possible, and decelerated at the end of the cycle as quickly as possible.

With the concept presented here, it is now possible to convert the greatest portion of the energy, which otherwise would be uselessly destroyed in an impact. Additionally, the noise development can be reduced and the service life of the generator can be increased. The high efficiency of an induction generator presented herein is due, in particular, to the fact that the force for the acceleration of the relatively heavy movable magnet system is no longer needed. As a side effect, the mechanical losses in the linear bearing of the moving parts, as well as the danger caused by the relatively low energy frequency, that the system could end up, in a vibration range related to practice, in an unintended resonance oscillation, and generate energy, which could lead to the generation of an unintended wireless signal, are eliminated.

According to the approach presented here, it is no longer necessary to completely reverse the poles in a magnet core. As a result, system costs can be reduced, because there are no high demands to the material otherwise used for a magnet core, or to the final annealing stage. No, or only minimal, magnetic losses have to be compensated for. An induction generator designed in accordance with embodiments of this invention does not require a gearing, which reduces the efficiency, and does not have a complex mechanical structure, but instead unites all of the criteria that result in an optimal electromechanical energy converter, in particular for self-sufficient wireless systems. These include a smaller structural space, a greater energy density, a higher efficiency, a shorting activation path, a lower activation force, a lower noise development, an energy quantity that is as constant as possible, a functioning that is independent of the actuation speed, durability with regard to temperature changes, mechanical stability, as well as lower manufacturing costs.

The described approach is in response to the increasing demand for self-sufficient wireless systems, which are capable of implementing complex wireless protocols such as KNX-RF, ZigBe, Bluetooth Low Energy or W-LAN with high transmission performance and numerous repetitions. This is only possible with extremely efficient generators (0.7 to 2 mWs). A simple enlargement of known energy converters is not expedient thereby, because the operability of such systems is not possible, or is strongly impaired, due to the further increasing actuation forces and dimensions as well as the increased noise development. The induction generator described below can be used in those application fields in which a large energy yield is necessary with a smaller construction.

An induction generator, having at least one permanent magnet for generating a permanent magnetic field, at least one reflux plate for guiding the permanent magnetic field, a coil and a spring element, wherein the permanent magnet and at least a section of the reflux plate are separated from one another by an air gap through which the permanent magnetic field passes, and wherein the coil is connected to the spring element, and at least a section of the coil is disposed such that it can move in the air gap, is characterized in that the spring element is designed to cause an oscillating movement, in response to a deflection of the coil, of at least the section of the coil in the air gap, transverse to a magnetic flux of the permanent magnetic field inside the air gap.

The induction generator, or electric generator, is a device that is designed to generate electrical current or electrical voltage by means of electromagnetic induction. An induction generator of this type can be used, for example, in conjunction with a self-sufficient wireless switch, which is used, for example, to switch a lighting system on and off. The at least one permanent magnet can, for example, exhibit iron, cobalt, nickel, or ferrite, or an alloy of a plurality of these metals, and can be designed to form a static magnetic field, the permanent magnetic field. The permanent magnet can be a single piece, and have opposing poles on opposite sides, a south pole and a north pole. By way of example, the permanent magnet can have pole shoes made of a material exhibiting higher permeability on the opposing sides. Corresponding to one polarity of the permanent magnet, the one pole shoe can form the north pole, and the other pole shoe can form the south pole. By means of the pole shoe, the magnetic flux generated by the permanent magnet can be guided and distributed in a defined manner. Alternatively, the permanent magnet can be comprised of numerous pieces, and be composed, for example, of at least two or more permanent magnet elements.

According to one embodiment two such permanent magnets, each of which represents a discrete permanent magnet, can be connected to one another via a shared connecting plate. The two permanent magnets can be spaced apart on the connecting plate thereby, such that the north pole of the one permanent magnet and the south pole of the other permanent magnet lie on a surface of the connecting plate, and form a U-shaped permanent magnet within the overall assembly. The polar surfaces of the U-shaped permanent magnet may lie in a plane, and the oscillation movement can occur parallel to this plane. The connecting plate can be designed as a flat, rectangular plate, in order to optimally conduct the magnetic flux between the individual permanent magnet elements. The reflux plate can resemble the connecting plate in terms of the material, construction and dimensions thereof, or can be identical thereto, and used to ensure an annular course of the magnetic flux. The permanent magnet and the reflux plate can be disposed lying opposite one another, wherein, e.g. the reflux plate and the connecting plate for the two permanent magnet elements form an upper and lower surface of a magnet system formed in this manner. Based on the annular magnetic flux generated by the construction of the magnet system, the permanent magnetic field can exhibit two opposing magnetic flux currents in the air gap.

The coil can have a winding made of one or a plurality of wires, e.g. made of copper, and thus be connected to the spring element, which is supported, according to one embodiment, parallel to the winding plane, and according to another embodiment, is supported about a rotational axis running in the winding plane, such that it can be deflected in the at least one air gap. The deflection of the coil can occur by means of a deflection means in the induction generator, in order to initiate the oscillation movement of the coil enabled by the spring element.

The oscillation movement can be a damped vibration, the strength of which is dependent on a specific construction and/or a specific spring force of the spring element, which weakens over time, and finally dies off. An electrical alternating current can be induced in the winding of the coil via the vibration of the coil occurring transverse to the magnetic flux, or the magnetic flux currents, respectively. One or more spring elements can be used, which support the coil, and can enable the oscillation movement of the coil. A spring element can be a spring that has been designed such that it is suitable for this purpose, e.g. a flexible spring, a torsion spring, a tension spring, or a compression spring.

According to one embodiment of the induction generator, the permanent magnet, the reflux plate, and one end of the spring element can be fixed, or permanently attached, to a supporting structure for the induction generator. This embodiment has the advantage that, in particular, the relatively heavy elements of the magnet system can be used statically for generating a current, by means of which the noise development is minimized, and the service life of the induction generator can be extended. Likewise, the structural size of the induction generator can be reduced, because the supporting structure does not need to withstand a load caused by an acceleration of the heavy magnets. The supporting structure can be a housing, or a part of a housing for the induction generator. The coil can be supported by the spring element such that it can move in relation to the supporting structure, and thus in relation to the permanent magnetic field.

According to one embodiment, the permanent magnet and the reflux plate can be separated from one another by the air gap. Thus, no point of contact can exist between the permanent magnet and the reflux plate. Furthermore, the coil can be movably disposed in the air gap. The entire coil can be located thereby inside the air gap. The spring element can be designed to cause the oscillation movement of the coil in the air gap, transverse to the magnetic flux of the permanent magnetic field inside the air gap in response to the deflection of the coil. Advantageously, the oscillation movement can comprise opposing linear movements of the coil.

The induction generator can be designed such that the permanent magnetic field forms a magnetic field circuit, the magnetic flux of which flows from a first pole of the permanent magnet, through a first section of the air gap, through the reflux plate, and through a second section of the air gap, to a second pole of the permanent magnet. A first winding half of the coil can be disposed thereby in the first section of the air gap, and second winding half of the coil can be disposed in the second section of the air gap. The winding halves can be disposed on opposing sides of the coil. Thus it can be advantageously ensured that both winding halves of the coil are subjected to a maximum magnetic effect. Accordingly, a greater efficiency in terms of current generation can be obtained through simple means.

A central axis of the coil can run parallel, or nearly parallel to the magnetic flux through the first section and second section of the air gap. The winding of the coil runs about the central axis of the coil, such that the central axis can be oriented such that it is orthogonal to a winding plane of the coil comprising the winding. By orienting the coil at a right angle to the magnetic flux, a maximum voltage can advantageously be induced in the winding of the coil by means of the oscillation movement.

According to another embodiment, the induction generator can have a first permanent magnet for generating a first magnetic flux current of the permanent magnetic field, a first reflux plate for guiding the first magnetic flux current, a second permanent magnet for generating a second magnetic flux current of the permanent magnetic field, and a second reflux plate for guiding the second magnetic flux current. The first magnetic flux current can flow thereby in a first magnetic field circuit from a first pole of the first permanent magnet, through a first section of the air gap, and through the first reflux plate, to a second pole of the first permanent magnet, and the second magnetic flux current can flow in a second magnetic field circuit from a first pole of the second permanent magnet through the second reflux plate and through a second section of the air gap, to a second pole of the second permanent magnet. In particular, a first winding half of the coil can be disposed thereby in the first section of the air gap, and second winding half of the coil can be disposed in the second section of the air gap. By way of example, the first reflux plate and the second reflux plate can each be designed such that they are bent into a U-shape, wherein the respective permanent magnet lies on an inner surface of a leg of the U-shaped reflux plate, and is covered by an inner surface of the other leg. By this means it is possible to obtain that both magnetic flux currents, in turn, flow annularly in the respective magnet system. Aside from a redundancy, which exists as a result of the two magnetic flux currents that can be operated independently of one another in order to form the permanent magnetic field, this embodiment exhibits a particularly simply possibility for the encapsulation of the induction generator, exhibiting a desired dust and/or water tightness, because the U-shaped reflux plates encompass the sensitive coil/spring system such that they are practically fully protected, and only a gap between the first and the second reflux plates needs to be closed.

According to one embodiment, the at least one permanent magnet can be disposed inside the coil. In this manner, the coil can be disposed such that it can move in relation to the permanent magnet. As a result of this configuration of the permanent magnet, the induction generator can be designed in a very compact manner.

The coil can be rotatably supported about a rotational axis running through the winding plane of the coil, in order to be able to execute the oscillation movement. For this, small deflections of the coil may be sufficient for generating a sufficient electrical power.

A first reflux plate resting against a first pole section of the permanent magnet and a second reflux plate resting against a second pole section of the permanent magnet can be provided thereby. The pole sections can be implemented by pole shoes or by end sections of the permanent magnet. The first reflux plate can have a first angled section, extending along a first longitudinal side of the permanent magnet, and the second reflux plate can have a second angled section extending along a second longitudinal side of the permanent magnet, lying opposite the first longitudinal side. The longitudinal sides can run parallel to a central axis of the permanent magnet running between the pole sections. A first air gap can be located between the permanent magnet and the first angled section, and a second air gap can be located between the permanent magnet and the second angled section. A first section of the coil can be movably disposed thereby in the first air gap, and a second section of the coil can be movably disposed in the second air gap.

With the specified embodiment, the spring element for the inductive generator can have a first flat flexible spring and a second flat flexible spring, between which the coil can be supported in the air gap such that it can oscillate. Flat flexible springs can be used inexpensively and in a space saving manner, such that they ensure a suitable oscillation of the coil. A so-called spring parallelogram can be formed by means of the flat flexible springs, with which the coil be caused to oscillate in a particularly uniform and sustained manner. An efficiency of the induction generator can thus be increased further.

Alternatively to the flat flexible spring, other elements that generate and support an oscillation of the coil, such as simple leaf springs or even a diaphragm, can be used in or as the spring element.

According to one embodiment, the spring element can represent an electrical conductor for establishing electrical contact with the coil. For this, one section of the spring element can comprise a contact element for discharging current of an alternating current provided due to the oscillation movement by the coil. Thus, the spring element can be used to conduct the electrical current induced in the coil, between the coil and an electrical load, for example. Advantageously, two spring elements can be used that are electrically insulated from one another, by means of which the coil can establish an electrical contact, as well as be movably supported in relation to a supporting structure for the induction generator. By way of example, electrical connections for the coil can make electrical contact via two flat flexible springs, wherein the flat flexible springs are electrically insulated from one another. Construction space can be saved with this embodiment, because a separate current outlet is no longer necessary.

In particular, the coil for the induction generator can be designed without a core. In this manner, the coil can be created with a particularly low weight. As a result, there is the advantage that the coil can be quickly brought to oscillate from a stationary position, against only a very low resistance, and the oscillation itself can exhibit a very high frequency. In this manner as well, the efficiency of the induction generator can be improved.

The coil can be enclosed in a coil mount. The coil mount can be connected to an end of the spring element lying opposite the end affixed to the supporting structure. Thus, a spring force from the spring element can be transferred to the coil via the coil mount, with little loss, and in a uniform manner. At the same time, this embodiment enables a simple implementation of the conducting of the electrical current generated in the winding of the coil to the spring element, in order to discharge current via a contact integrated in the spring element, for example. When flat flexible springs disposed on both sides of the coil are used as the spring element, the coil mount can, for example, have to projections, with which, in each case, one end of the flat bending spring can engage, in order to retain the coil mount.

Furthermore, the coil mount can have an actuating element for deflecting the coil. The actuating element can, for example, be designed in the form of an actuating tongue, and be disposed such that it can be readily accessed by an actuator, and can deflect the coil from its stationary state in one of two opposing directions. After the actuating element has been activated, the oscillation movement of the coil can be initiated.

The induction generator can have a detection device for detecting a starting polarity of the alternating current provided due to the oscillation movement of the coil. The starting polarity depends on an initial direction of the oscillation movement resulting from the deflection, and is thus dependent on a direction of the deflection of the coil. Accordingly, the detection device can be designed to detect an initial direction of an alternating current provided as a result of the oscillation movement of the coil. As a result, it can be determined, for example, in which of the two opposing directions the coil is deflected by means of the actuating element for initiating the oscillation movement. In this manner, it is possible to detect the direction in which an actuating element of the induction generator is moved. In this manner it is possible to distinguish between a switch-on procedure and a switch-off procedure.

The present invention also creates a method for generating an electrical current using an induction generator having at least one permanent magnet for generating a permanent magnetic field, at least one reflux plate for guiding the permanent magnetic field, a coil and a spring element, wherein the permanent magnet and at least a section of the reflux plate are separated from one another by an air gap formed in the permanent magnetic field, and wherein the coil is connected to the spring element and at least a section of the coil is movably disposed in the air gap, wherein the method exhibits the following steps:

Deflection of the coil, in order to cause an oscillation movement of at least the section of the coil in the air gap transverse to a magnetic flux of the permanent magnetic field inside the air gap; and Generation of the electrical current in the coil by means of electromagnetic induction based on the oscillation movement of the coil.

The inventive concept presented herein can also be advantageously implemented in this from of an inventive method.

Figure 1B:
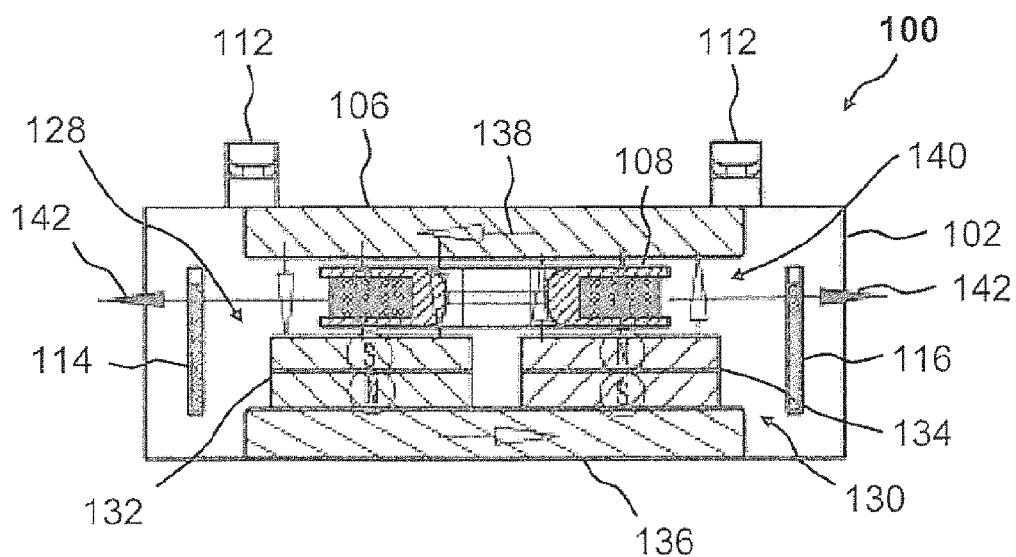
Figure 1C:
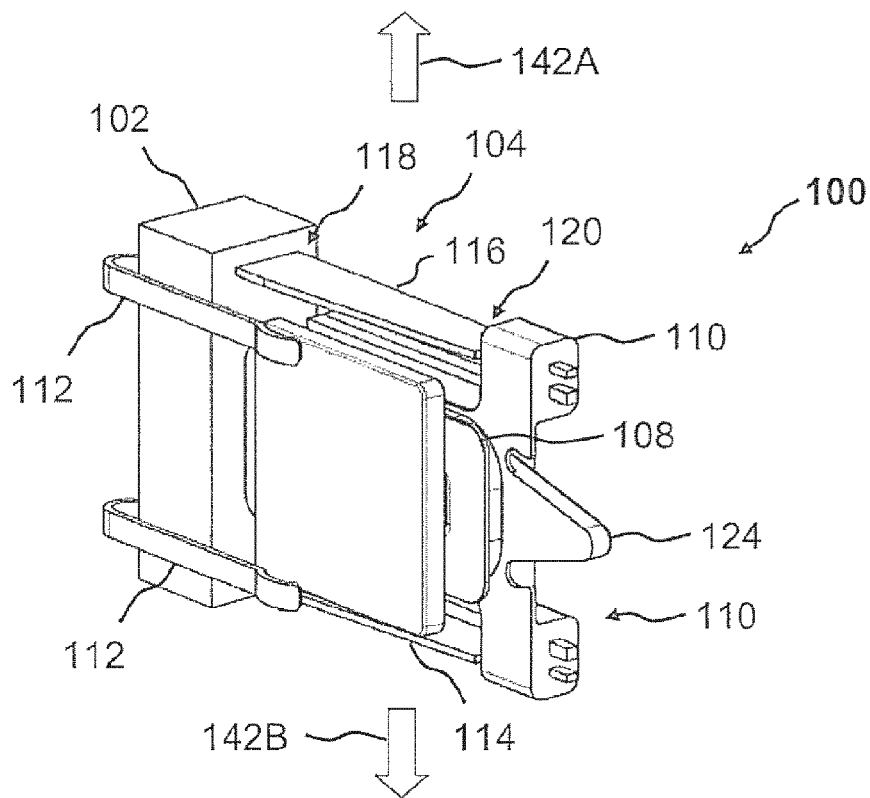
Figure 1D:
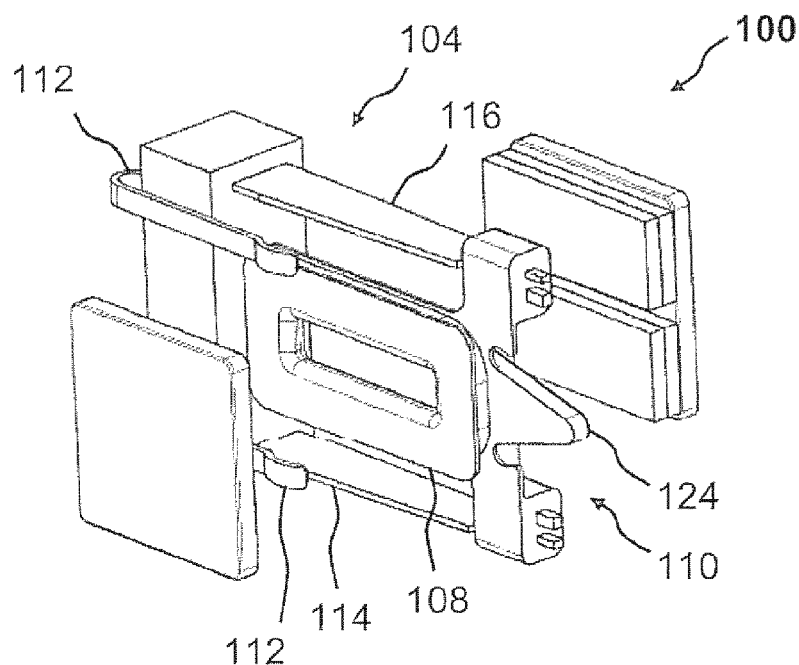
Figure 2A:
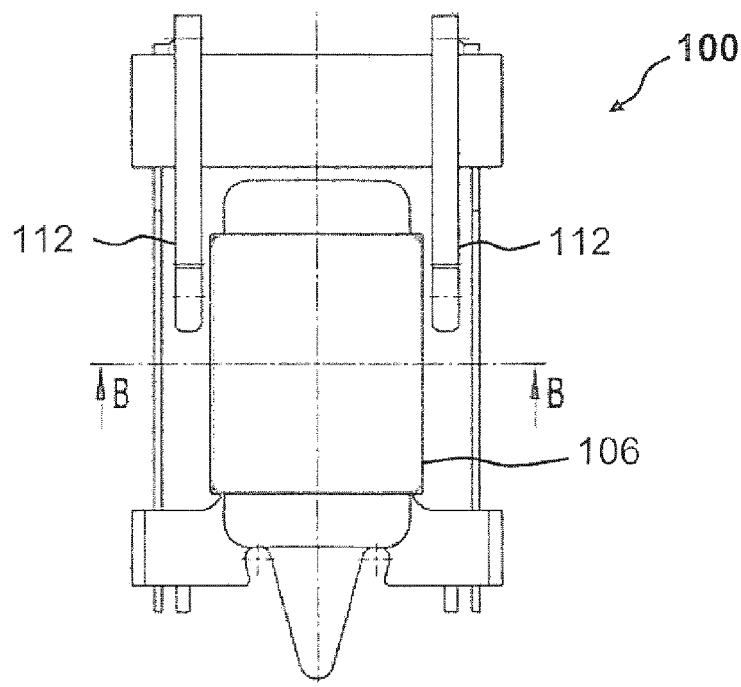
Figure 2B:
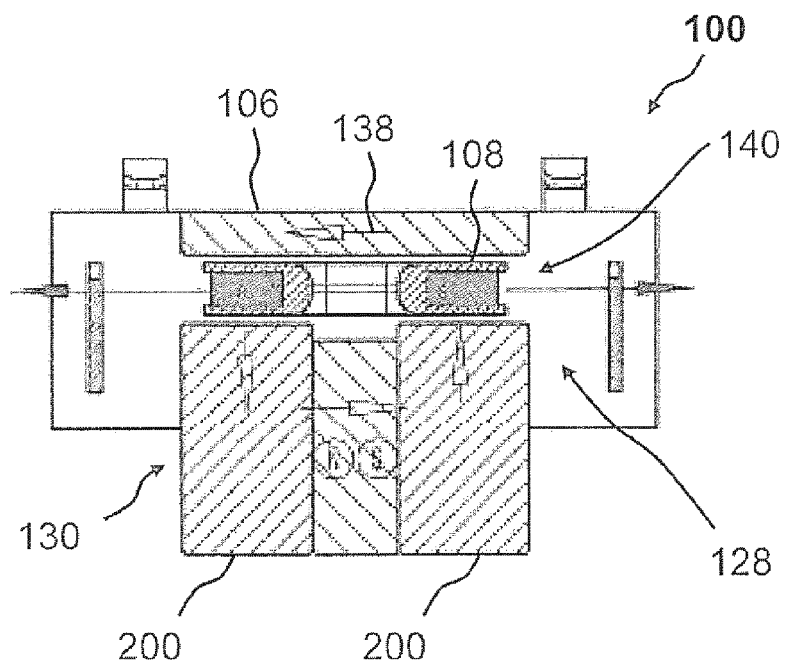
Figure 3A:
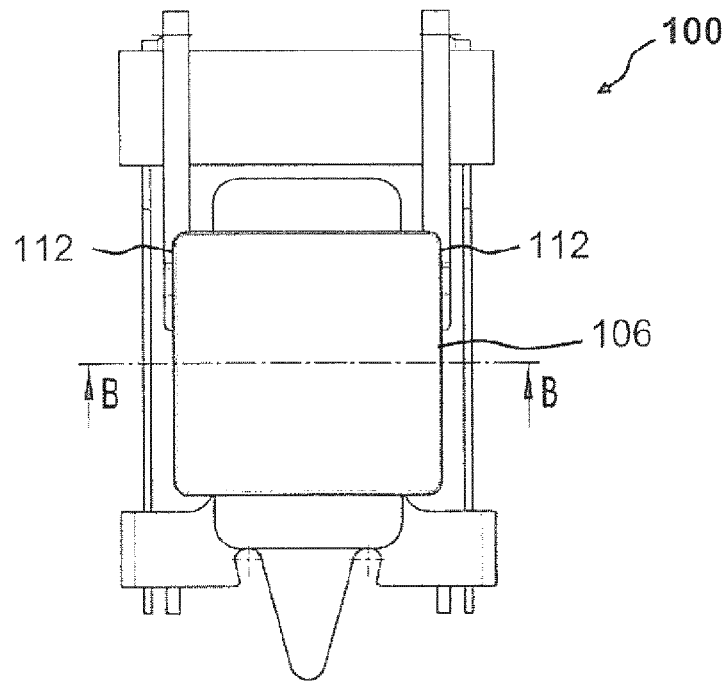
Figure 3B:
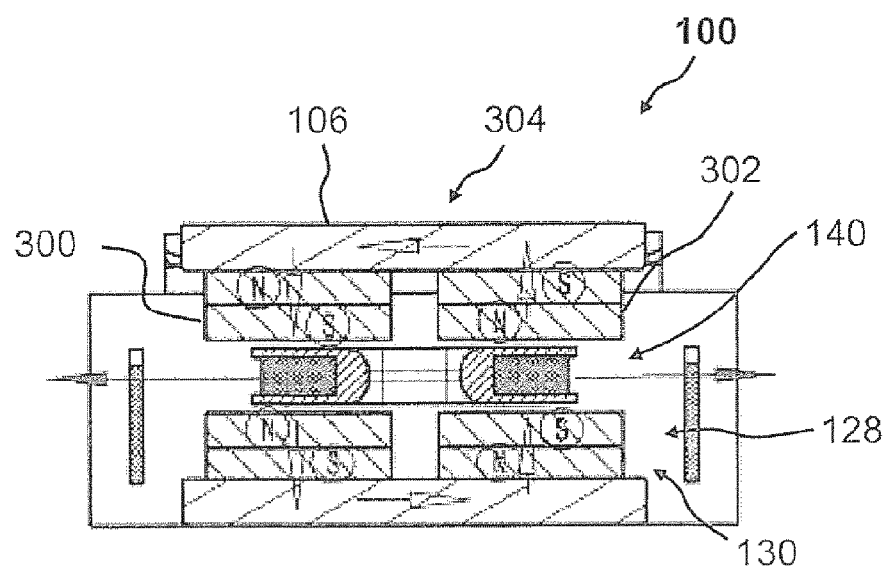
Figure 4:
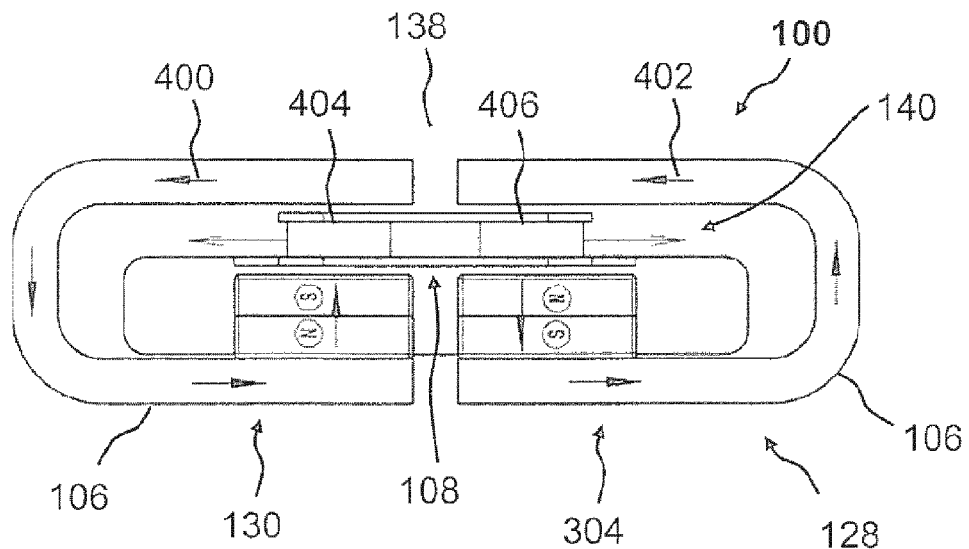
Figure 5:
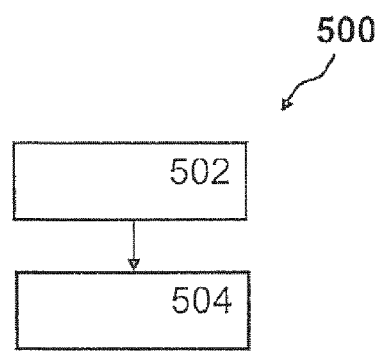
Figure 6:
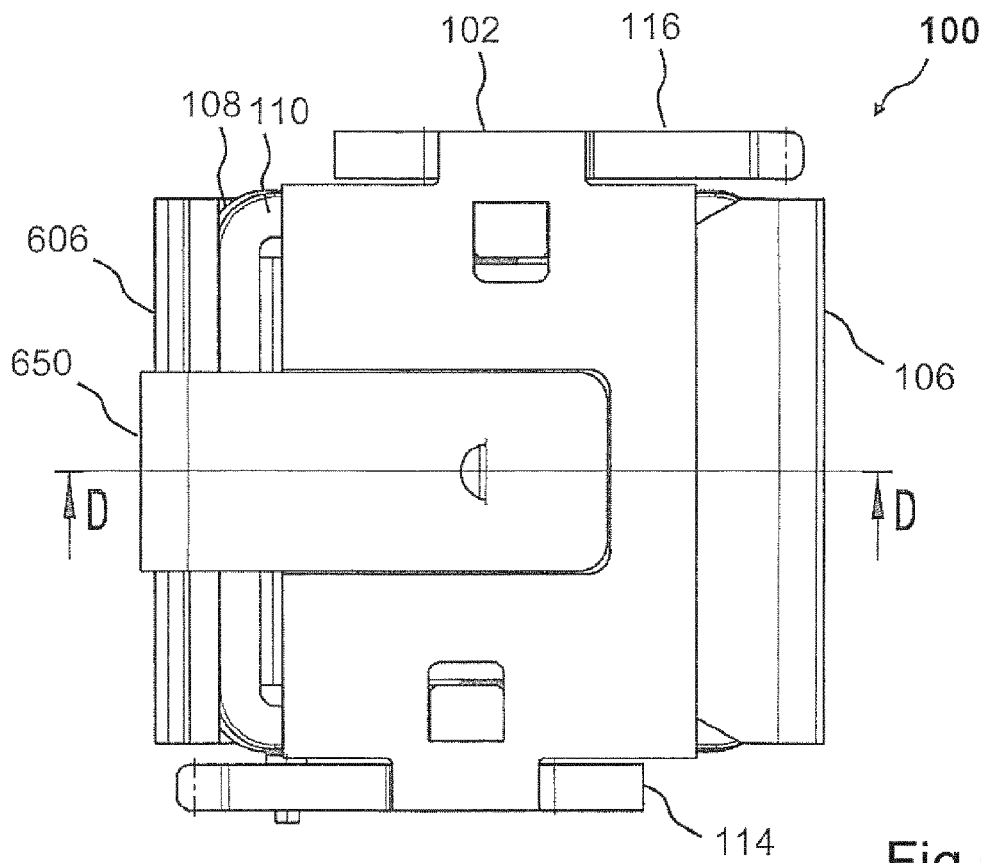
Figure 7:
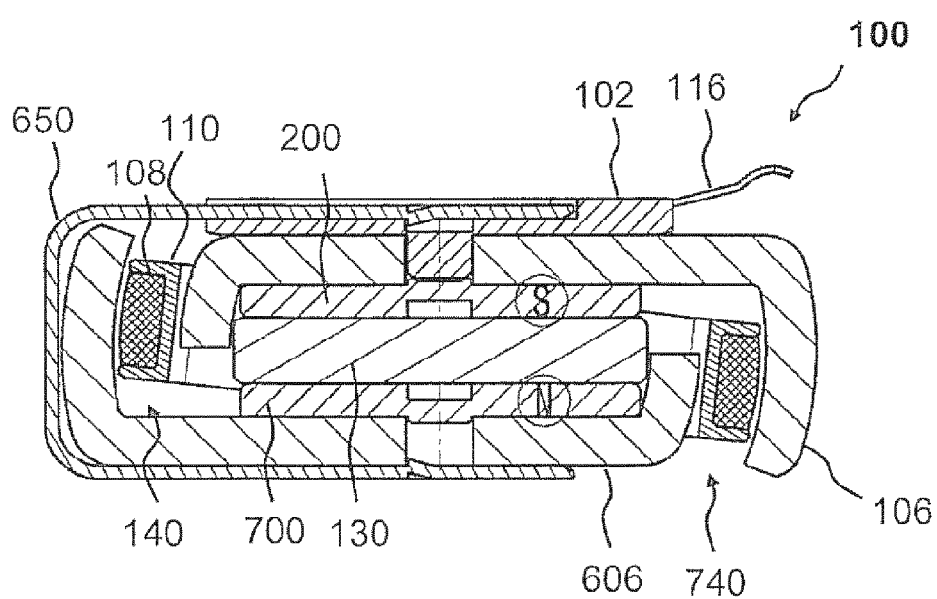
Figure 8:
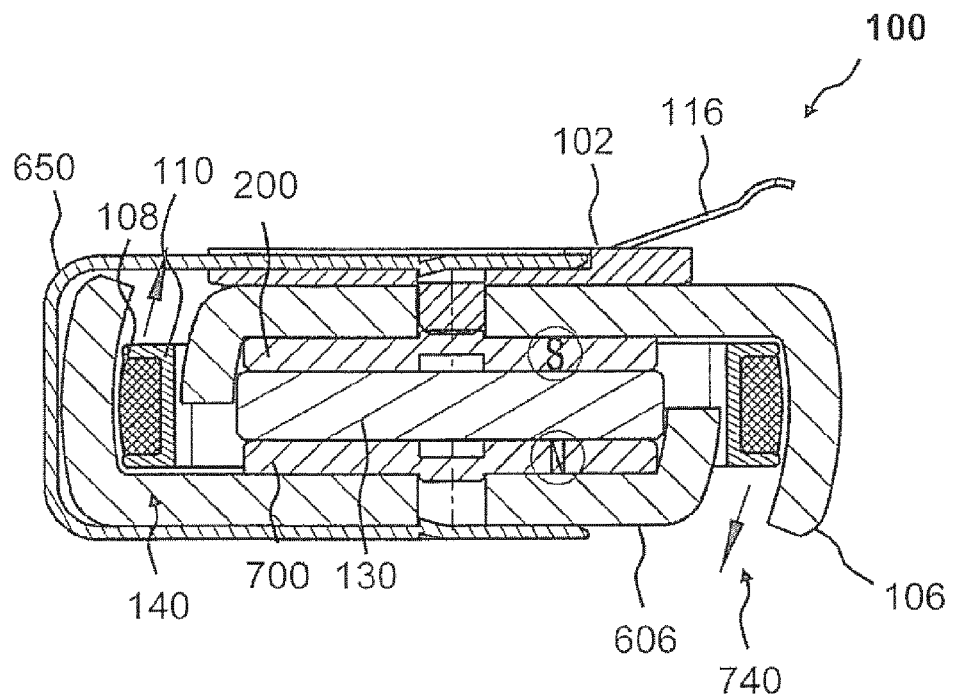
Figure 9:
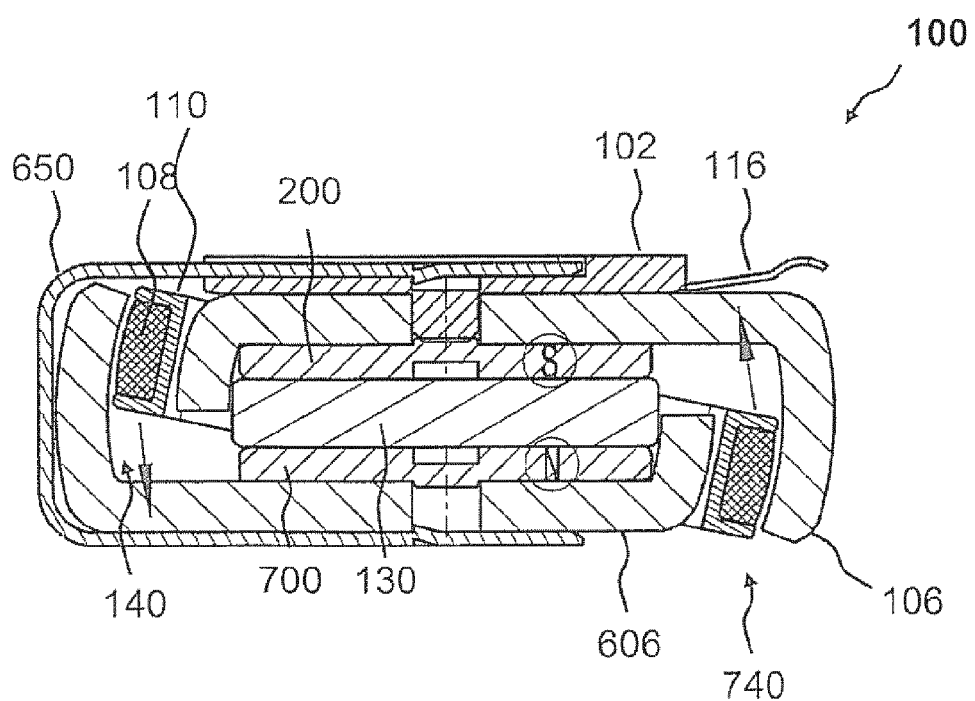
Figure 10:
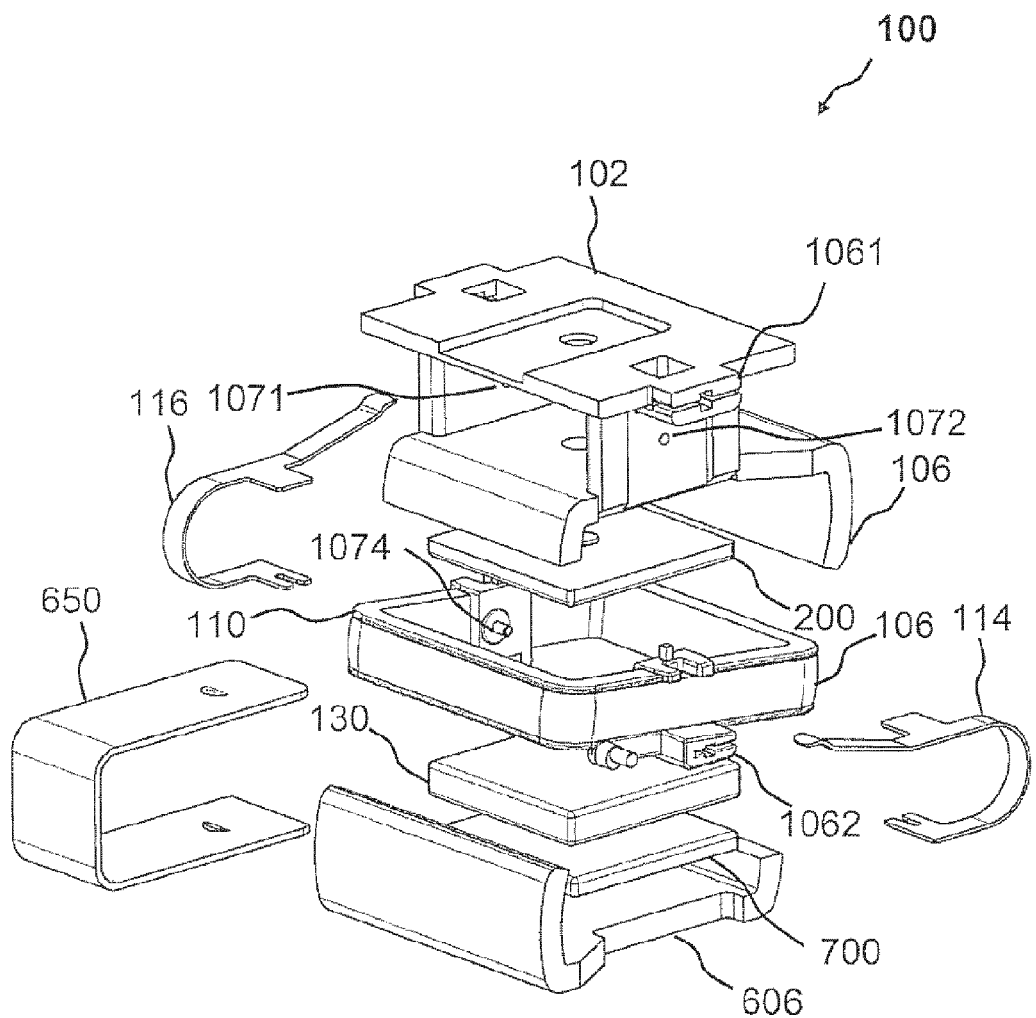
Figure 11:
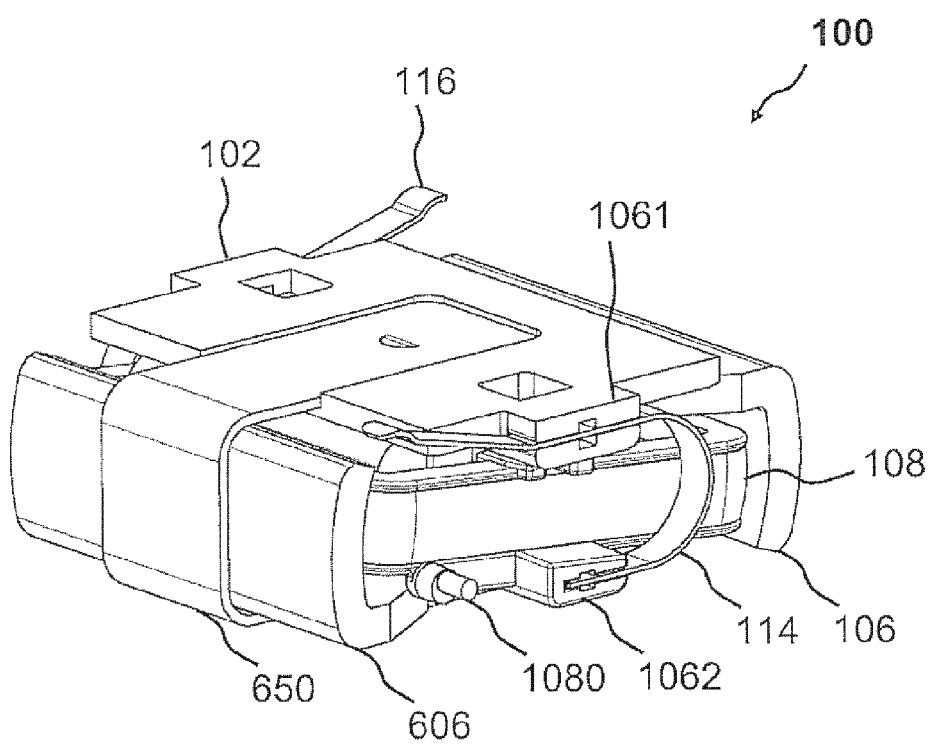

The invention shall be explained in greater detail, by way of example, based on the attached drawings. Shown are:

FIG. 1A a top view of an induction generator according to one embodiment example of the present invention;

FIG. 1B a cross-sectional view of the induction generator from FIG. 1A;

FIG. 1C the induction generator from FIG. 1A in a perspective depiction;

FIG. 1D the induction generator from FIG. 1A in an exploded view;

FIG. 2A a top view of an induction generator according to another embodiment example of the present invention;

FIG. 2B a cross-sectional view of the induction generator from FIG. 2A;

FIG. 3A a top view of an induction generator according to another embodiment example of the present invention;

FIG. 3B a cross-sectional view of the induction generator from FIG. 3A;

FIG. 4 a cross-sectional view of an induction generator according to another embodiment example of the present invention;

FIG. 5 a flow chart for a method for generating an electrical current using an induction generator, according to an embodiment example of the present invention;

FIG. 6 a top view of an induction generator according to another embodiment example of the present invention;

FIG. 7 a cross-sectional view of the induction generator from FIG. 6;

FIG. 8 another cross-sectional view of the induction generator from FIG. 6;

FIG. 9 another cross-sectional view of the induction generator from FIG. 6;

FIG. 10 an exploded view of the induction generator from FIG. 6;

FIG. 11 a depiction of the induction generator from FIG. 10.

In the following description of preferred embodiment examples of the present invention, the same, or similar, reference symbols shall be used for the elements depicted in the figures and elements having similar functions, wherein a description of these elements shall not be repeated.

The basic construction of an inventive induction generator shall be illustrated using the following figures. The exemplary induction generators described in the figures can be used, in particular, for the operation of a self-sufficient wireless switch.

FIG. 1A shows, in a top view, an induction generator 100 according to one embodiment example of the present invention. A supporting structure 102, a spring element 104, a reflux plate 106, a coil 108 in a coil mount 110, as well as a current outlet 112 are shown.

In the embodiment example of the induction generator 100 shown in FIG. 1, the spring element 104 is composed of a first flat flexible spring 114 and a second flat flexible spring 116, each of which runs parallel on the side of the coil 108 and the reflux plate 106. The coil 108 is designed as a flat, rectangular winding, of which only a part can be seen in the depiction in FIG. 1, because it is covered by the reflux plate 106. One end 118 of the spring element 104 formed by the flat flexible springs 114, 116 is attached to the supporting structure 102, and another end 120 engages with two projections 122 of the coil mount 110 in which the coil 108 is supported. Thus, the coil 108 is merely connected to the supporting structure 102 indirectly, via the spring element 104, and is supported in the induction generator 100 by means of the spring element 104 such that it can move, or oscillate.

The coil 108 can be deflected by means of an actuating element 124 for the coil mount 110, designed in the shape of a tongue, and can be caused to oscillate, supported by the spring element 104, in a magnetic field of a magnet system, not shown in the depiction in FIG. 1, for the induction generator 100, in order to generate an electrical current flow in the winding of the coil 108, by exploiting the Lorentz force. One section of the spring element 104 coupled to the coil 108 via the coil mount 110 forms a contact element 126, by means of which the electrical current induced in the coil 108 flows to the current outlets 112 connected to the contact element 126, and can be accessed there. The current outlets 112 are disposed such that they partially overlap the reflux plate 106.

The induction generator 100 can be attached to an object, e.g. a wall, by means of the supporting structure 102. For this, suitable fastening elements, e.g. screws, can be used. During the oscillation of the coil 108 it moves, while the supporting structure 102, the magnet system, and the magnetic circuit caused by the magnet system remain stationary. If the induction generator 100 is attached to an object, then the coil 108 executes a movement during the oscillation, while the supporting structure 102, the magnet system and the object remain stationary.

FIG. 1B shows a cross-sectional view of the induction generator 100 from FIG. 1A, cut along a line B-B in FIG. 1A, in accordance with an embodiment example of the present invention. In this depiction, in particular, a previously specified magnet system 128 for the induction generator 100, and the placement thereof with respect to the coil 108 can be readily identified. The magnet system 128 is composed of the reflux plate 106 and a permanent magnet 130 lying opposite. The permanent magnet 130 is formed here by a first permanent magnet element 132, a second permanent magnet element 134, and a connecting plate 136, coupling the first permanent magnet element 132 and the second permanent magnet element 134. The first permanent magnet element 132 makes contact with the metal connecting plate 136 with its north pole, and the second makes contact with its south pole, such that the entire assembly forms a U-shaped permanent magnet 130, with which the first permanent magnet element 132 forms the first pole, the second permanent magnet element 134 forms the second pole, and the connecting plate 136 forms the yoke. The magnet system forms a permanent magnetic field, indicated by a plurality of arrows. In the depiction in FIG. 1B, a magnetic flux of the permanent magnetic field 138 flows counter-clockwise. The coil 108 is movably supported in the permanent magnetic field 138, by means of the first flat flexible spring 114 and the second flat flexible spring 116, in an air gap 140 located between the permanent magnet 130 and the reflux plate 106, such that it can oscillate after a deflection by means of the actuating element in a relative movement 142 indicated by the horizontal arrow in the depiction in FIG. 1B.

As is illustrated by the depiction in FIG. 1B, the magnet system 128 has a static structure. It is substantially composed of the two permanent magnet elements 132, 134, which are magnetically coupled on one side to the reflux sheet, or the connecting plate 136, respectively, without an air gap, and the second reflux iron, or reflux plate 106, respectively, is magnetically engaged by means of the air gap 140. Thus, two constant magnetic fields, or magnetic flux currents, running in opposite directions, are generated in the air gap 140. The light, flat, rectangular winding of the coil 108, without an iron core, is located in the air gap 140. The coil 108 is movably supported, and can execute the relative movement 142 along the air gap 140.

FIG. 1C shows the induction generator 100 from FIG. 1A in a perspective depiction, according to one embodiment example of the present invention. Here, the support provided for the coil 108 by the spring element 104 is visibly documented. As shown by the illustration, the support is composed here of two flat flexible springs 114, 116, which are disposed running parallel to one another. Both spring ends are fixed at the one end 118 of the spring element 104 in the housing, or in the supporting structure 102, respectively, and on the other end 120, to the coil body, or the coil mount 110, respectively. Because of this configuration, in the form of a parallelogram, the first spring 114 and the second spring 116 can become deformed, in parallel, in the directions 142A, 142B, indicated by means of the arrows, such that the coil 108 can execute a quasi parallel movement of the relative movement of the oscillation, and thus form a very good oscillating body. A substantial advantage of this concept is that mechanical losses occur only from an internal friction in the springs 114, 116—which can be regarded as nearly negligible—and from air resistance during the oscillation movement of the coil 108. Added to this are electrical resistance losses in the coil 108, which, however, are present in every type of generator. Because the first flat spring 114 and the second flat spring 116 are electrically insulated from one another, they can be simultaneously used for current discharge purposes, or for an electrical connection to the coil 108. End wires of the coil 108 can establish contact with the other spring ends 120, directly or indirectly, via additional contact pins. The spring ends of the first end region 118 can be formed as spring contacts, on one or both sides, and enable contact to an arbitrary electronic module, in an extremely simple and inexpensive manner.

FIG. 1D shows the induction generator 100 from FIG. 1A in an exploded view, according to one embodiment example of the present invention. The spring element 104, designed as a "spring parallelogram," can be readily identified here. Although it is advantageous to support the coil 108 by means of the "spring parallelogram," this is not absolutely necessary. The coil 108 can, e.g. also be supported in an oscillating manner by means of a simple leaf spring, or a diaphragm. A simple pivotal support or a linear support in combination with torsional, tension, or compression springs is also possible. The spring elements 114, 116, flexible foils, sliding contacts, or wires can be used thereby for the current discharge.

In the following, a functionality of the induction generator 100 depicted in FIGS. 1A to 1D, in accordance with one embodiment of the present invention, shall be discussed.

In order to actuate the generator 100, the actuation tongue 124 of the coil body 110 is acted on by an actuator, deflected in one of the two directions 142A, 142B to a specific extent, or with a specific force, and abruptly released. The coil 108 begins to oscillate in the constant magnetic field 138, and electrical energy is induced therein, according to the Lorentz force law, which is discharged by the two oscillation-contact springs, or flat flexible springs 114, respectively, for supplying a transmitter module. An oscillation amplitude of the coil 108 decreases, as a function of the counter induction, depending on power consumption, until the coil body 110 comes to rest. The pulse length can be controlled by a spring constant for the spring element 104 and a weight of the coil 108. Losses are substantially comprised here of the air resistance during the oscillation, and resistance losses in the copper winding of the coil 108. With this concept, obtainable efficiencies lie between 65 and 80%. The ferromagnetic circuit of the magnet system 128 of the energy converter 100 is only used in a sub-region of the magnetic hysteresis, in contrast to conventional systems, and thus places no high demands on the magnetic properties, and significantly reduces the system costs. The induction generator 100 generates an alternating current. It is possible to measure the polarity, e.g. the first sinusoidal half-wave, and to use this to determine the direction. Thus, an "on" and "off" signal, for example, can be generated and transmitted, depending on the actuation direction of the generator 100, and this being without additional encoding contacts.

As has already been mentioned, and is shown in the following figures, the magnet system 128 for the energy converter 100 can be constructed in a variety of ways.

FIGS. 2A and 2B show another embodiment example of the induction generator 100.

FIG. 2A shows the exemplary induction generator 100 in a top view. It shows that the upper surface of this embodiment example of the induction generator 100 corresponds substantially to that shown in FIG. 1A, with the difference that the induction generator 100 shown in FIG. 2A is narrower, and the current outlets 112 do not overlap the reflux plate 106.

Differences between the induction generator shown in FIGS. 1A to 1D and that in FIGS. 2A and 2B become clear, in particular, when looking at the cross-sectional view in FIG. 2B. In this case, the permanent magnet 130 is formed by only a single magnet, the orientation of which, in contrast to the other embodiment example, runs parallel to the winding of the coil 108, and which has two pole shoes 200. The magnetic circuit 128 is equipped here with a larger magnet 130 having the two pole shoes 200 on each side. The flux guide plate, or reflux plate 106, respectively, is physically separated from the rest of the magnet system 128 in turn by the air gap 140. The flux density of the magnetic flux of the permanent magnetic field 138 at the pole surfaces of the permanent magnet 130 can be significantly increased with the construction shown here. The flux density can be calculated from the relationship between the pole surfaces of the magnet 130 and the pole surfaces of the pole shoes 200.

FIGS. 3A and 3B show another embodiment example of the induction generator 100.

In the top view, the embodiment example of the induction generator 100 corresponds to that shown in FIG. 1A, with the difference that with the induction generator 100 in FIG. 3A, the reflux plate 106 is disposed above the current outlets 112.

The cross-sectional view in FIG. 3B discloses that, in contrast to the other embodiment examples, the induction generator 100 shown herein additionally has a third permanent magnet element 300 and a fourth permanent magnet element 302, which form an additional permanent magnet 304 in combination with the reflux plate 106. The additional permanent magnet 304 forms a mirror image of the permanent magnet 130, separated therefrom by the air gap 140, and forms, together therewith, the magnet system 128.

FIG. 4 shows, in a cross-sectional view, another embodiment example of the induction generator 100. The magnetic circuit 128 is formed here, as well, by the permanent magnet 130 and the permanent magnet 304, wherein here, however, two reflux plates 106 are used, which are bent into a U-shape. The permanent magnetic field 138 is divided here, accordingly, into a first magnetic flux current 400 and a second magnetic flux current 402. The coil 108 is disposed in the air gap 140 formed here by the U-shape of the reflux plates 106, such that a first winding half 404 of the coil 108 is exposed to the first magnetic flux current 400, and a second winding half 406 of the coil 108 is exposed to the second magnetic flux current 402. In particular, the construction selected in FIG. 4 enables a simple encapsulation of the generator 100, if, for example, a dust- or water-tight design is desired.

As a matter of course, magnet systems 128 constructed differently than those in the figures are also possible. It is important that the winding halves 404, 406 of the coil 108 can oscillate in a magnetic field 138 that is as strong as possible. The movable oscillation system for the induction generator 100 has a very compact and light design. As a result, the coil 108 can only begin to oscillate in an unintended manner when subjected to very strong vibrations from the exterior. In order to prevent "false" wireless signals from being generated, the oscillating member, or the coil 108, respectively, can be blocked in a stationary and end position by means of the actuator in a switch housing. Another possibility is to measure the induced voltage, and to acknowledge only a voltage increase above a certain level as a switching signal.

FIG. 5 shows a flow chart for an embodiment example of a method 500 for generating an electrical current using an induction generator. The method 500 can be advantageously executed in conjunction with an induction generator, such as that explained in detail based on the preceding or subsequent FIGS. 1A to 4. In a step 502, a coil, movably supported by means of a spring element, is deflected by the actuation of an actuating element in the induction generator to a defined extent, or with a defined force. As a result, the coil executes an oscillation movement transverse to a magnetic flux of a permanent magnetic field existing in the induction generator. In a step 504, an electrical current is induced in the winding of the coil by means of an electromagnetic induction based on the oscillation movement of the coil. By means of suitable contacts, the electrical current can be accessed for operating, for example, a self-sufficient wireless switch.

FIG. 6 shows, in a top view, an induction generator 100 according to another embodiment example of the present invention. The induction generator 100 has a supporting structure 102, a first reflux plate 106 and a second reflux plate 606. The reflux plates 106, 606 are connected in a fixed manner to the supporting structure 102. A coil 108 contained in a coil mount 110 is supported by means of a spring element composed of a first flat flexible spring 114 and a second flat flexible spring 116, such that it can move in relation to the supporting structure 102 and the reflux plates 106, 606. The flat flexible springs 114, 116 are disposed on opposite sides of the induction generator 100. The reflux plates 106, 606 are disposed between the flat flexible springs 114, 116. The assembly, comprising the supporting structure 102 and the reflux plates 106, 606 is held together by a clamp 650. The clamp 650 is disposed centrally, between the flat flexible springs 114, 116.

The induction generator 100 can be attached by means of the supporting structure 102 to an object, e.g. a wall. For this, suitable fastening elements, e.g. screws, can be used. When the coil 108 executes an oscillation movement during the operation of the induction generator 100, the supporting structure 102 and the reflux plates 106, 606 remain stationary.

FIG. 7 shows a cross-sectional view of the induction generator 100 from FIG. 6, cut along a line D-D shown in FIG. 6, in accordance with an embodiment example of the present invention. In this depiction, the supporting structure 102, the reflux plates 106, 606, the clamp 650 and the coil 108 supported in the coil mount 110 can be seen. A permanent magnet 130 is disposed between the reflux plates 106, 606. According to this embodiment example, the permanent magnet 130 has two optional pole shoes 200, 700. A shown free end section of the flat flexible spring 116 can be used as the electrical contact for establishing electrical contact with the coil 108.

The permanent magnet 130 is disposed between the pole shoes 200, 700. The permanent magnet 130 has a rectangular cross-section. The pole shoes 200, 700 are in the shape of a plate, and rest against the permanent magnet 130 on opposite sides. The pole shoes 200, 700 form polar sections of the permanent magnet 130. According to this embodiment example, the first pole shoe 200 functions as the south pole, and the second pole shoe 700 as the north pole.

A central section of the first reflux plate 106 lies on a surface of the first pole shoe 200 facing away from the permanent magnet 130. The first pole shoe 200 has a projection, disposed centrally, for example, which engages in a through-hole in the first reflux plate 106. By this means, a slipping of the first pole shoe 200 in relation to the first reflux plate 106 can be prevented. A short angled section of the first reflux plate 106 and a longer angled section of the first reflux plate 106 border on opposite ends of the middle section of the first reflux plate 106. The short and long angled sections are oriented in the same direction, in this case downward, such that the first reflux plate 106 has, basically, a U-shape. The angled sections are each angled at basically a right angle in relation to the middle section of the first reflux plate 106, and toward the permanent magnet 130. The middle section of the first reflux plate 106 ends on the side of the short angled section at the edge of the first pole shoe 200, but extends on the side of the long angled region, however, beyond the opposite edge of the first pole shoe 200. The short angled section of the first reflux plate 106, on the left in this case, extends along an edge of the first pole shoe 200, and somewhat over an edge of the permanent magnet 130. The short angled section of the first reflux plate 106 can rest against the edge of the first pole shoe and on the edge of the permanent magnet 130. The long angled section of the first reflux plate 106, on the right in this case, extends along an edge of the first pole shoe 200, the edge of the permanent magnet 130, and the edge of the second pole shoe 700. As a result, the long angled section of the first reflux plate 106 exhibits a spacing to the pole shoes 200, 700 and the permanent magnet 130, due to the projection of the middle section over the edge of the first pole shoe 200.

A middle section of the second reflux plate 606 lies on a surface of the second pole shoe 700 facing away from the permanent magnet 130. The second pole shoe 700 has a projection, disposed centrally, for example, that engages in a through-hole in the second reflux plate 606. As a result, a slipping of the second pole shoe 700 in relation to the second reflux plate 606 can be prevented. A short angled section of the second reflux plate 606 and a longer angled section of the second reflux plate 606 border opposite ends of the middle section of the second reflux plate 606. The short and long angled sections point in the same direction, upward in this case, such that the second reflux plate 606 has basically a U-shape. The angled sections are each angled at basically a right angle to the middle section of the second reflux plate 606, and toward the permanent magnet 130. The middle section of the second reflux plate 606 ends on the side of the short angled section at the edge of the second pole shoe 700, but extends on the side of the long angled section, however, beyond the edge of the second pole shoe 700. The short angled section of the second reflux plate 606, on the right in this case, extends along an edge of the second pole shoe 700, and somewhat over an edge of the permanent magnet 130. The short angled section of the second reflux plate 606 can lie against the edge of the second pole shoe 700, and on the edge of the permanent magnet 130. The long angled section of the second reflux plate 606, on the left in this case, extends along an edge of the second pole shoe 700, the edge of the permanent magnet 130, and the edge of the first pole shoe 200. As a result, the long angled section of the second reflux plate 606 exhibits a spacing to the pole shoes 200, 700 and the permanent magnet 130, due to the projection of the middle section over the edge of the second pole shoe 700.

The short angled section of the first reflux plate 106 is disposed on the same side of the induction generator 100 as the long angled section of the second reflux plate 606. The short angled section of the first reflux plate 106 and the long angled section of the second reflux plate 606 partially overlap one another. The long angled section of the second reflux plate 606 extends to basically the height of a surface of the middle section of the first reflux plate 106 facing away from the first pole shoe 200. Overlapping regions of the short angled section of the first reflux plate 106 and the long angled section of the second reflux plate 606 are separated from one another by a first air gap 140. A first section of the coil 108 is disposed in the first air gap 140. The surfaces of the short angled section of the first reflux plate 106 and the long angled section of the second reflux plate 606 facing the air gap 140 each have a curvature, which is adjusted to a movement radius of the first section of the coil 108 inside the first air gap 140. The permanent magnetic field generated by the permanent magnet 130 crosses the air gap 140. The movement of the first section of the coil 108 inside the first air gap 140 occurs nearly perpendicular to the magnetic field lines of the permanent magnetic field crossing through the air gap 140.

The long angled section of the first reflux plate 106 is disposed on the same side of the induction generator 100 as the short angled side of the second reflux plate 606. The long angled section of the first reflux plate 106 and the short angled section of the second reflux plate 606 partially overlap one another. The long angled section of the first reflux plate 106 extends basically to the height of a surface of the middle section of the second reflux plate 606 facing away from the second pole shoe 700. Overlapping regions of the long angled section of the first reflux plate 106 and the short angled section of the second reflux plate 606 are separated from one another by a second air gap 740. A second section of the coil 108 lying opposite the first section is disposed in the second air gap 740. The surfaces of the long angled section of the first reflux plate 106 and the short angled section of the second reflux plate 606 facing the second air gap 740 each have a curvature, which is adjusted to a movement radius of the second section of the coil 108 inside the second air gap 740. The permanent magnetic field generated by the permanent magnet 130 crosses the second air gap 740. The movement of the second section of the coil 108 inside the second air gap 740 occurs nearly perpendicular to the magnetic field line of the permanent magnetic field crossing through the second air gap 740.

The supporting structure 102 lies flat against a surface of the first reflux plate 106 facing away from the first pole shoe 200. According to this embodiment example, the supporting structure 102 has an extension that engages in a through-hole in the first reflux plate 106. The clamp 650 extends along an outer surface of the supporting structure 102, as well as along an outer surface of the second reflux plate 606, and engages with a first hook in a recess in the supporting structure 102 lying opposite the projection on the supporting structure 102, and with a second hook in the recess in the second reflux plate 606.

The coil mount 110 is designed as a rectangular ring having an outer, circumferential groove. The winding, or windings, forming the coil 108 is/are disposed in the groove. The winding plane of the coil 108 is clamped in place by means of the circumferential groove. The permanent magnet 130 is disposed inside an interior space of the coil mount 110 enclosed by the coil mount 110. The rotational axis of the coil 108 runs through the winding plane of the coil 108 as well as crossing through the permanent magnet 130.

The coil is shown in its stationary state in FIG. 7. In the stationary state, a central axis of the coil 108, which is orthogonal to a winding plane of the coil 108, is tilted slightly in relation to a central axis of the permanent magnet 130 running between the poles of the permanent magnet 130. The coil 108 is supported such that it can rotate about a rotational axis in relation to the permanent magnet 130. The rotational axis runs, according to this embodiment example, parallel to the course of the edges of the angled sections of the reflux plates 106, 606. Starting from the stationary position, the coil 108 can be deflected in both rotational directions about the rotational axis, by means of which a current is induced in each case in the winding or windings of the coil 108, due to the permanent magnetic field.

FIG. 8 shows another cross-sectional view of the induction generator 100 from FIG. 7 in accordance with an embodiment example of the present invention. The coil 108 is shown in a first deflected position. In order to get from the stationary position shown in FIG. 7 to the first deflected position shown in FIG. 8, the first section of the coil 108, located in the first air gap 140, is moved toward the middle section of the second reflux plate 606, and the second section of the coil 108, located in the second air gap 740, is moved toward the middle section of the first reflux plate 106. Starting from the shown first deflected position, the coil 108 can start to oscillate, the starting direction of movement of which is indicated by arrows. The induction generator 100 can have an actuating element, which is connected to the coil mount 110. The coil 108 can be moved to the first deflected position by an actuation of the actuating element. The flat flexible springs 116, by means of which the coil is supported, are tensioned thereby.

FIG. 9 shows another cross-sectional view of the induction generator 100 from FIG. 7, in accordance with an embodiment example of the present invention. The coil 108 is shown in a second deflected position. In order to get from the stationary position shown in FIG. 7 to the second deflected position shown in FIG. 9, the first section of the coil 108, located in the first air gap 140, is moved toward the middle section of the first reflux plate 106 and the second section of the coil 108, located in the second air gap 740, is moved two the middle section of the second reflux plate 606. Starting from the shown second deflected position, the coil 108 can start to oscillate, the starting direction of movement of which is indicated by arrows. The coil can be moved to the second deflected position by an actuation of the actuating element in the opposite direction of the actuation described in FIG. 8. the flat flexible springs 116, by means of which the coil is supported, are tensioned thereby.

Starting from the deflected position shown in FIG. 8 or in FIG. 9, the coil 108 can execute an oscillation movement, driven by the flat flexible springs 116, which runs in an alternating manner in the directions indicated by the arrows in FIGS. 8 and 9.

FIG. 10 shows the induction generator 100 from FIG. 6 in an exploded view, in accordance with an embodiment example of the present invention.

The permanent magnet 130 and the pole shoes 200, 700 are each designed as rectangular plates. The coil 108 has a rectangular cross-section surface. The coil mount 110 is designed as an encompassing ring, inside which the permanent magnet 130 and the pole shoes 200, 700 can be disposed.

The flat flexible springs 114, 116 are each U-shaped in design. The supporting structure 102 and the coil mount 110 exhibit slot-shaped receiving elements 1061, 1062, into which sections of the flat flexible springs 114, 116 can be inserted in order to attach the flat flexible springs 114, 116, on one hand, to the supporting structure 102, and on the other hand to the coil mount 110. In FIG. 10, only the receiving elements 1061, 1061 for the flat flexible springs 114 can be seen thereby. The receiving elements for the flat flexible springs 116 are designed in a manner corresponding to the shown receiving elements 1061, 1062. The free ends of the flat flexible springs 114 point in the opposite directions of the free ends of the flat flexible springs 116 in the assembled state. Electrical contact to the coil 108 can be established via the flat flexible springs 114, 116.

The supporting structure 102 has a base plate, disposed in the assembled state parallel to the middle section of the first reflux plate 106, and two lateral walls, extending upward from the base plate at a right angle, which, in the assembled state, form lateral guides for the reflux plates 106, 606 and optionally for the pole shoes 200, 700 and the permanent magnet 130. The lateral walls are guided, in the assembled state, inside the coil mount 110. The lateral walls exhibit through-holes 1071, 1072 for receiving pins 1074 on the coil mount 110 functioning as rotational shafts. The rotational axis of the coil 108 runs through the through holes 1071, 1072.

An actuating element 1080 is disposed on the coil mount 110, by means of which the coil 108 can be deflected from its stationary position, counter to return forces exerted by the flat flexible springs 114, 116.

According to this embodiment example, the coil 108 is rotatably supported by means of an axle, and is designed to oscillate about the axle when the induction generator 100 is in operation. The magnet system for the induction generator 100 is formed by the magnet 130. The intermediate pole shoes 200, 700, which in this case are designed as flat iron squares, are provided as placeholders, in order to reduce the volume of the magnet 130. According to one embodiment example, the generator 100 can be equipped with an inexpensive hard ferrite magnet serving as the permanent magnet 130. In this case, the intermediate pole shoes 200, 700 can be eliminated.

FIG. 11 shows an induction generator 100 from FIG. 10 in the assembled state, in accordance with an embodiment example of the present invention. The flat flexible spring 114 can be seen, the first end of which is inserted in the coil mount 110 and the end section of which, lying opposite the first end, is inserted through the receiving element 1061 on the supporting structure 102, such that the second end of the flat flexible spring 114 is free, and can be used as an electrical contact.

The embodiment examples described herein, and shown in the figures, are only selected by way of example. Different embodiment examples can be combined with one another, entirely, or with respect to individual features. Furthermore, an embodiment example can be supplemented with features of another embodiment example. If an embodiment example comprises an "and/or" conjunction between a first feature and a second feature, then this can be read as meaning that the embodiment example according to one embodiment can have both the first feature and the second feature, and according to another embodiment, has either only the first feature, or only the second feature.

REFERENCE SYMBOLS

100 induction generator
102 supporting structure
104 spring element
106 reflux plate
108 coil
110 coil mount
112 current outlet
114 first flat flexible spring
116 second flat flexible spring
118 end of the spring element
120 other end of the spring element
122 projection on the coil mount
124 actuating element 126 contact element
128 magnet system
130 permanent magnet
132 first permanent magnet element
134 second permanent magnet element
136 connecting plate
138 permanent magnetic field
140 air gap
142A direction of spring movement
142B direction of spring movement
200 pole shoe
300 third permanent magnet
302 fourth permanent magnet
304 further permanent magnet
400 first magnetic flux current
402 second magnetic flux current
404 first winding half of the coil
406 second winding half of the coil
500 method for generating an electric current
502 deflection step
504 generating step
606 second reflux plate
650 clamp
700 second pole shoe
740 second air gap
1061 receiving element
1062 receiving element
1071 through-hole
1072 through-hole
1074 pin
1080 actuating element

The invention claimed is:

1. An induction generator, comprising:
a permanent magnet configured to generate a permanent magnetic field;
a reflux plate configured to guide the permanent magnetic field;
a coil; and
a spring element;
wherein the permanent magnet and a section of the reflux plate are separated from one another by an air gap through which the permanent magnetic field passes;
wherein the coil is connected to the spring element and at least a section of the coil is movably disposed in the air gap; and
wherein in response to a deflection of the coil, the spring element is configured to cause the section of the coil to oscillate in the air gap transverse to the magnetic flux of the permanent magnetic field inside the air gap; and
wherein the permanent magnetic field is configured to generate a magnetic flux through a magnetic field circuit, the magnetic flux is configured to flow from a first pole of the permanent magnet through a first section of the air gap, through the reflux plate and through a second section of the air gap to a second pole of the permanent magnet, and wherein a first winding half of the coil is disposed in the first section of the air gap and a second winding half of the coil is disposed in the second section of the air gap.

2. The induction generator according to claim 1, wherein the permanent magnet, the section of the reflux plate, and an end of the spring element are attached to a supporting structure of the induction generator.

3. The induction generator according to claim 1, wherein the portion of the reflux plate is the entire reflux plate and wherein the section of the coil is the entire coil.

4. The induction generator according to claim 1, wherein a central axis of the coil extends parallel to the magnetic flux in the first section and the second section of the air gap.

5. The induction generator according to claim 1, wherein the permanent magnet is a first permanent magnet configured to generate a first magnetic flux of the permanent magnetic field;
wherein the first flux plate is a first reflux plate guiding the first magnetic flux;
the induction generator further comprising:
a second permanent magnet configured to generate a second magnetic flux of the permanent magnetic field; and
a second reflux plate configured to guide the second magnetic flux;
wherein the second magnetic flux flows from a first pole of the second permanent magnet through the second reflux plate and through a second section of the air gap to a second pole of the second permanent magnet; and
wherein a first winding half of the coil is disposed in the first section of the air gap and a second winding half of the coil is disposed in the second section of the air gap.

6. The induction generator according to claim 1, further comprising a coil mount configured to support the coil, wherein the permanent magnet is disposed inside the coil mount.

7. The induction generator according to claim 1, wherein the coil is rotatably supported about a rotational axis extending through a winding plane of the coil; and
wherein the oscillation movement of the coil is a rotational oscillation about the rotational axis.

8. The induction generator according to claim 1, wherein the spring element comprises a first flat flexible spring and a second flexible spring; and
wherein the coil is movably supported in the air gap between the first flat flexible spring and the second flexible spring.

9. The induction generator according to claim 1, wherein the spring element is an electrical conductor configured to establish an electrical contact with the coil.

10. The induction generator according to claim 1, wherein the coil is designed without a core.

11. The induction generator according to claim 1, wherein the coil is enclosed in a coil mount, which is connected to a first end of the spring element lying opposite to a second end of the spring element.

12. An induction generator comprising:
a permanent magnet configured to generate a permanent magnetic field, the permanent magnetic field configured to generate a magnetic flux through a magnetic field circuit;
a first reflux plate and a second reflux plate configured to guide the permanent magnetic field, the first reflux plate rests against a first pole section of the permanent magnet, the first reflux plate includes a first angled section extending along a first longitudinal side of the permanent magnet, and the second reflux plate rests against a second pole section of the permanent magnet and includes a second angled section extending along a second longitudinal side of the permanent magnet opposite to the first longitudinal side;
a coil; and
a spring element;
wherein a first air gap is located between the first pole section and the first angled section and a second air gap is located between the second pole section and the second angled section through which the permanent magnetic field passes;

wherein the coil is connected to the spring element and a first section of the coil is movably disposed in the first air gap and a second section of the coil is movably disposed in the second air gap; and wherein in response to a deflection of the coil, the spring element is configured to cause the first section of the coil to oscillate in the first air gap and the second section of the coil to oscillate in the second air gap transverse to the magnetic flux of the permanent magnetic field inside the first air gap and the second air gap.

13. A method for generating an electrical current, comprising:

generating a permanent magnetic field by a permanent magnet, the permanent magnetic field configured to generate a magnetic flux through a magnetic field circuit;

guiding the permanent magnetic field by a reflux plate, wherein the permanent magnet and a section of the reflux plate are separated from one another by an air gap through which the permanent magnetic field passes, and wherein a coil is connected to a spring element, and at least a section of the coil is movably disposed in the air gap;

deflecting the coil to cause an oscillation movement of the section of the coil in the air gap, transverse to a magnetic flux of the permanent magnetic field inside the air gap, wherein the magnetic flux is configured to flow from a first pole of the permanent magnet through a first section of the air gap, through the reflux plate and through a second section of the air gap to a second pole of the permanent magnet and a first winding half of the coil is disposed in the first section of the air gap and a second winding half of the coil is disposed in the second section of the air gap; and generating an electrical current in the coil through an electromagnetic induction of the coil when the section of the coil moves traverse to the magnetic flux.

* * * * *